Dec. 15, 1925.

E. R. EVANS 1,565,722

CLUTCH CONSTRUCTION

Filed Oct. 2, 1922     3 Sheets-Sheet 1

Inventor
Edwin R. Evans.

Attorneys.

Dec. 15, 1925.  
E. R. EVANS  
1,565,722  
CLUTCH CONSTRUCTION  
Filed Oct. 2, 1922  
3 Sheets-Sheet 2

Inventor  
Edwin. R. Evans.

Attorneys

Dec. 15, 1925.   1,565,722
E. R. EVANS
CLUTCH CONSTRUCTION
Filed Oct. 2, 1922   3 Sheets-Sheet 3
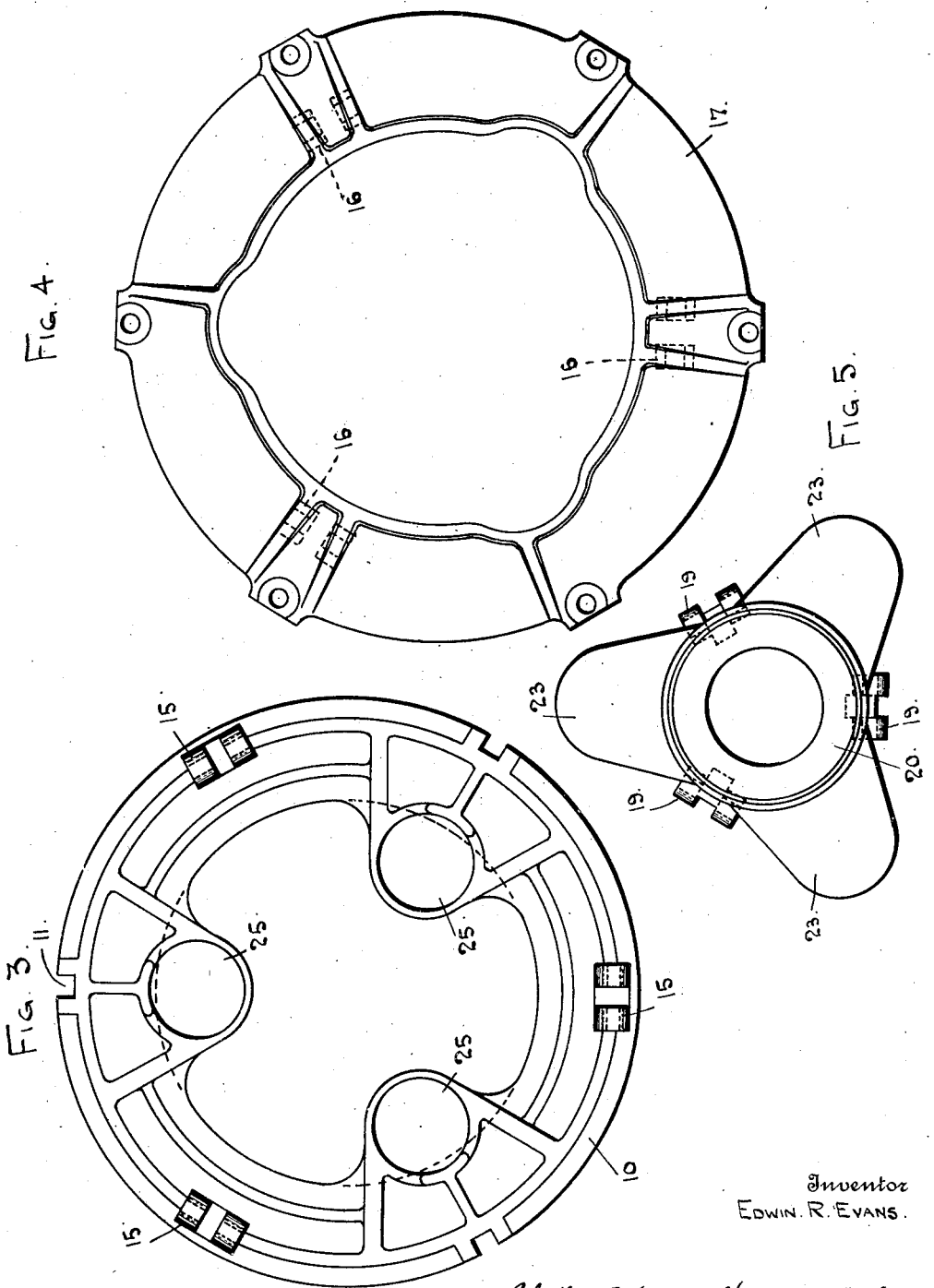
Inventor
EDWIN. R. EVANS.
Attorney Patented Dec. 15, 1925.

1,565,722

UNITED STATES PATENT OFFICE.

EDWIN R. EVANS, OF DETROIT, MICHIGAN.

CLUTCH CONSTRUCTION.

Application filed October 2, 1922. Serial No. 591,945.

*To all whom it may concern:*

Be it known that I, EDWIN R. EVANS, a citizen of the United States of America, residing at Detroit, in the county of Wayne and State of Michigan, have invented certain new and useful Improvements in Clutch Constructions, of which the following is a specification, reference being had therein to the accompanying drawings.

This invention relates to clutches and particularly to friction clutches designed for use in motor vehicles for connecting the source of power with the transmission mechanism.

An object of the invention is to provide an efficient and reliable construction for obtaining the desired friction with the use of lighter springs than ordinarily required.

Another object is to provide a simple and effective construction which is more readily operable than the usual type.

With the above and other objects in view the invention consists of certain novel features of construction, combination and arrangement of parts, as will be more fully described and particularly pointed out in the appended claims.

In the accompanying drawings:

Figure 3 is a detail view of the spring seating side of a plate through which pressure is applied to engage the driving and driven elements of the clutch;

Figure 4 is an exterior view of the cover plate for the driving ring.

Figure 5 is a detail view of the sleeve and integral projections.

Figure 1:
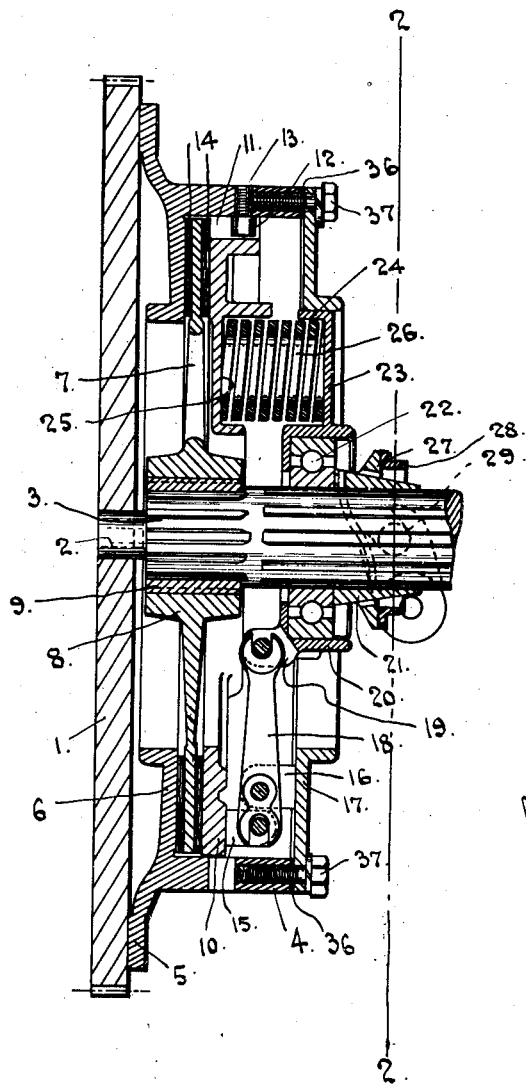
Figure 1 is a longitudinal sectional view on line 1—1 of Figure 2.
Figure 2:
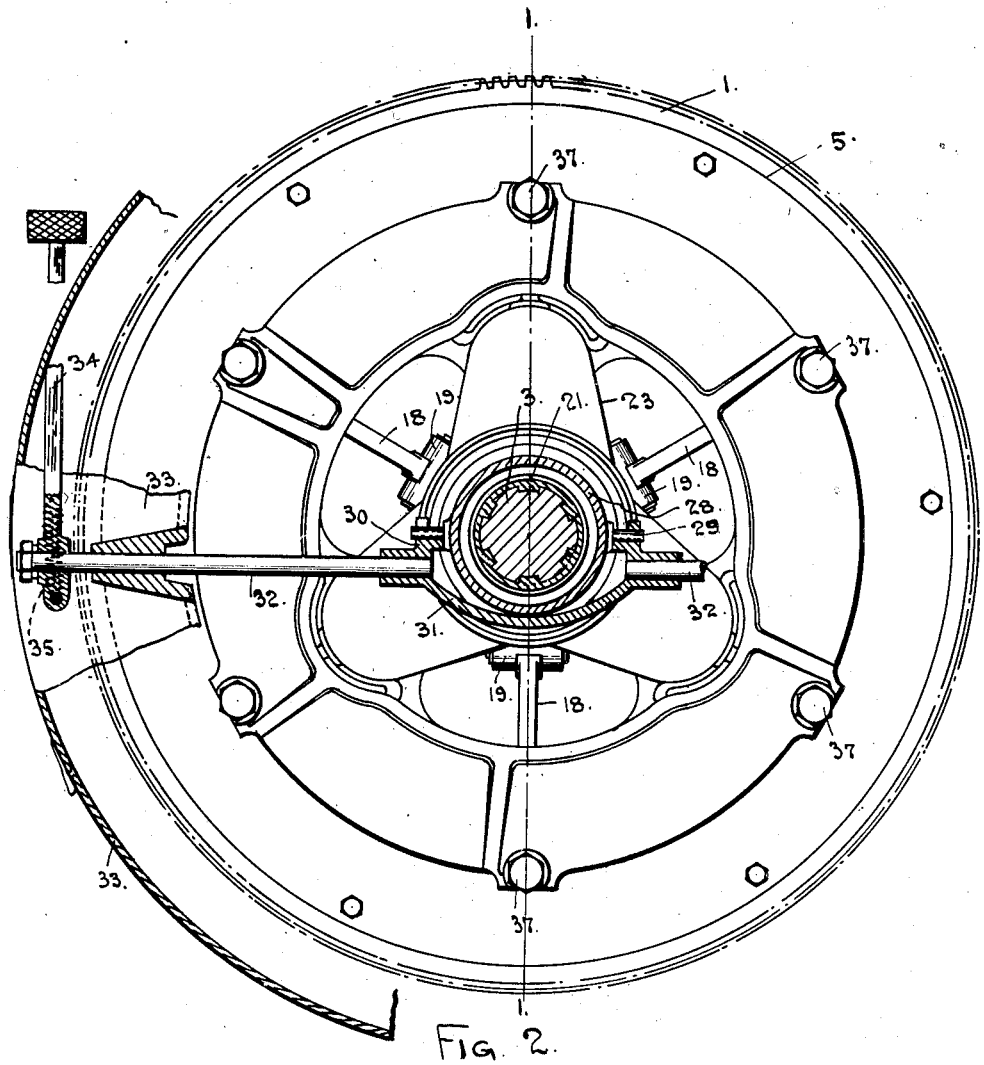
Figure 2 is a sectional view taken on line 2—2 of Figure 1 and showing a portion of the casing.

Referring now to the drawings in which like characters of reference designate corresponding parts throughout the several views, the numeral 1 designates a fly wheel of a motor having an axial opening 2 providing a bearing for the reduced end of a transmission shaft 3.

A driving ring 4 surrounds the transmission shaft and is provided with an outwardly extending annular flange 5 which is secured to one side of the fly wheel. The ring 4 is also provided with an inwardly extending annular flange 6 which is spaced from the fly wheel. The flange 6 serves as an abutment for a driven plate 7 which has a hub 8 splined upon a bushing 9 secured to the transmission shaft.

An annular pressure plate 10 is adapted to move the driven plate against the annular flange 6 and is provided with a plurality of transversely extending peripheral slots 11 which have a sliding engagement with the heads 12 of pins 13 secured to the inner wall of the ring 4. Friction bands 14 of any suitable material are located upon opposite sides of the driven plate and engage the annular flange 6 and the pressure plate 10. A plurality of spaced lugs 15 extend outwardly from the opposite side of the pressure plate and are located adjacent to a plurality of spaced lugs 16 extending inwardly from an annular cover plate 17 removably secured to the ring 4.

Levers 18 are fulcrumed upon the lugs 16 and are pivotally secured at one end to the lugs 15. The levers are pivotally connected at the opposite end to a plurality of spaced lugs 19 extending from a sleeve 20 surrounding a collar 21 slidably mounted on the transmission shaft 3. The sleeve 20 is movable with the collar 21 and cooperates therewith to form a housing for an anti-friction bearing 22. The sleeve 20 is provided intermediate its ends with a series of radially extending projections 23 which are provided at their edges with lateral flanges 24 and which are disposed opposite a series of spaced sockets 25 formed in the pressure plate. Coil springs 26 engage the projections 23 and sockets 25 and normally hold the driven plate 7 against the annular flange 6 of the driving ring 4.

Due to the arrangement of the levers, the force exerted by each spring against the pressure plate is multiplied many times so that the desired friction may be obtained by the use of relatively light springs.

The shims 36 are insertable between the inner edge of the ring 4 and the cover plate 17 and are retained in place by means of the screws 37. By adding the shims, the cover plate 17 and lugs 16 upon which the levers are fulcrumed are adjusted outwardly so that the force of the springs multiplied by the levers may be easily varied.

Any suitable means may be employed for actuating the collar 21 to release the clutch. As shown, the collar is provided with a flat surface 27 which is engaged by a collar 28 having trunnions 29 pivotally mounted upon a pair of U-shaped arms 30 extending upward from a yoke 31. A pair of aligned stub shafts 32 are rigidly secured to the yoke 31 at the opposite ends thereof and are journalled in suitable bearings in a sectional casing 33 which surrounds the clutch mechanism and the fly wheel. A suitable operating pedal 34 is rigidly secured to one of the stub shafts and is held in upright position by means of a coil spring 35.

In use, the springs 26 engaging the pressure plate 10 normally hold the driven plate 7 against the annular flange 6 of the driving ring 4. Upon operation of the pedal 34 to release the clutch, the yoke 31 is rocked which causes the collar 28 to move the collar 21 inwardly. The sleeve 20 is carried inwardly with the collar 21 and the levers 18 are rocked upon the lugs 16 so that the radially extending projections of the sleeve and the pressure plate are drawn together with the result that the springs 26 are compressed and the driven plate 7 is released from the driving ring 4.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:—

1. In a clutch, the combination with a driving member and a driven member, of a plurality of movable members, of spring means between said movable members for moving one of said movable members against said driven member to hold the latter against said driving member, and levers connecting said movable members and actuated by said spring means for multiplying the force exerted by the latter.

2. In a clutch, the combination with a driving member and a driven member, of a plurality of movable members, a plurality of springs between said movable members normally pressing one of said movable members against said driven member and holding the latter against said driving member, and levers connecting said movable members for moving the same together to compress said springs and release said driven member from said driving member.

3. In a clutch, the combination with a driving member and a driven member, of a plurality of movable members, a plurality of springs arranged between said movable members for pressing one of said movable members against said driven member to hold the latter against said driving member, and means connecting said movable members movable in one direction to multiply the force exerted by said springs and movable in the opposite direction to draw said movable members together and compress said springs for releasing said driven member from said driving member.

4. In a clutch, the combination with a driving member and a driven member, of a plurality of movable members, a plurality of springs arranged between said movable members for pressing one of said movable members against said driven member to hold the latter against said driving member, and levers connecting said movable members, movable in one direction to multiply the force exerted by said springs and movable in the opposite direction to draw said movable members together and compress said springs for releasing said driven member from said driving member.

5. In a clutch, the combination with a fly wheel and a transmission shaft, of a driving ring secured to said fly wheel and having an annular abutment, a driven plate splined upon said shaft, a pressure plate adapted to move said driven plate against said abutment, a sleeve movable longitudinally of said shaft and having a plurality of projections, springs disposed between said projections and said pressure plate normally holding said driven plate against said abutment, and levers connecting said sleeve and said pressure plate movable in one direction to multiply the force exerted by said springs and movable in the opposite direction to draw said pressure plate and sleeve together to compress said springs and release said driven plate from said abutment.

6. In a clutch, the combination with a fly wheel and a transmission shaft, of a driving ring secured to said fly wheel and having an annular abutment, a driven plate splined upon said shaft, a pressure plate adapted to move the driven plate against said abutment, a sleeve movable longitudinally of said shaft and having a plurality of projections, springs disposed between said projections and said pressure plate normally holding said driven plate against said abutment, levers connecting said sleeve and said pressure plate, and means for actuating said sleeve to compress said springs and release said driven plate from said abutment.

7. In a clutch, the combination with a fly wheel and a transmission shaft, of a driving ring secured to said fly wheel and having an annular abutment, a driven plate splined upon said shaft, a pressure plate adapted to move the driven plate against said abutment, a collar slidably mounted on said shaft, a sleeve surrounding said collar and movable therewith, an anti-friction bearing between said collar and said sleeve, said sleeve being provided with a plurality of projections, springs disposed between said projections and said pressure plate normally holding said driven plate against said abutment, levers connecting said sleeve and said pressure plate, and means for actuating said collar to release said driven plate from said abutment.

8. In a clutch, the combination with a transmission shaft and a fly wheel, of a driving ring secured to said fly wheel and having an annular abutment, a driven plate splined upon said shaft, an annular pressure plate adapted to move the driven plate against said abutment, a sleeve movable longitudinally of said shaft and having a plurality of projections, springs disposed between said projections and said pressure plate normally holding said driven plate against said abutment, an annular cover plate secured to said ring, levers fulcrumed upon said cover plate and connecting said sleeve and said pressure plate, and means for actuating said sleeve to compress said springs and release said driven plate from said abutment.

9. In a clutch, the combination with a driving member and a driven member, of a plurality of movable members, spring means arranged between said movable members for pressing one of said movable members against said driven member to hold the latter against said driving member, and means connecting said movable members movable in one direction to multiply the force exerted by said spring means and movable in the opposite direction to draw said movable members together and compress said spring means for releasing said driven member from the driving member.

10. In a clutch, the combination with a driving member and a driven member, of a plurality of movable members, spring means arranged between said movable members for pressing one of said members against said driven member to hold the latter against said driving member, and levers connecting said movable members movable in one direction to multiply the force exerted by said spring means and movable in the opposite direction to draw said movable members together and compress said spring means for releasing said driven member from said driving member.

In testimony whereof I affix my signature.

EDWIN R. EVANS.